Nov. 25, 1952

H. N. BLISS 2,618,983

VARIATOR

Filed July 19, 1949

Inventor
HARVEY N. BLISS

By
Lindsey Prutzman + Just
Attorneys

Nov. 25, 1952  H. N. BLISS  2,618,983
VARIATOR
Filed July 19, 1949  3 Sheets-Sheet 2

Inventor
HARVEY N BLISS
By
Lindsey, Prutzman + Just
Attorneys

Nov. 25, 1952 H. N. BLISS 2,618,983
VARIATOR
Filed July 19, 1949 3 Sheets-Sheet 3

Inventor
HARVEY N. BLISS

By
Lindsey, Prutzman & Just
Attorneys

Patented Nov. 25, 1952

2,618,983

UNITED STATES PATENT OFFICE 2,618,983

VARIATOR

Harvey N. Bliss, Windsor, Conn., assignor to Veeder-Root Incorporated, Hartford, Conn., a corporation of Connecticut Application July 19, 1949, Serial No. 105,501

11 Claims. (Cl. 74—342)

The present invention relates to liquid dispensing apparatus and more particularly to an improved speed change mechanism hereinafter referred to as a "variator" for use in liquid dispensing apparatus between the meter and register and adapted to be variously set to vary the drive from the meter to the register in accordance with the cost per unit of the liquid being dispensed, the cost per unit at which the variator is set being automatically indicated by readily visible indicating means.

It is an aim of the present invention to provide a variator which is of compact size and streamlined so that it may be utilized in liquid dispensing apparatus in a minimum of space and may be mounted with a minimum of difficulty without, however, sacrificing desirable performance characteristics of the variator and without the use of elements of reduced size or inadequate structural strength which normally would be susceptible to breakage and malfunctioning and would otherwise be undesirable.

A further aim of the invention is to provide a variator having a simplified setting mechanism to facilitate the setting of the variator at different speeds corresponding to price changes covering a wide range, it being particularly desired that the variator may be set manually with a minimum of inconvenience and difficulty and with accuracy and without strain or other possible damage to the device. In connection with this aim it is desired to provide a setting mechanism in which many of the parts utilized heretofore are eliminated and in which inaccuracies of setting are substantially avoided.

A further aim of the invention is to provide a simplified indicating arrangement for visibly showing the setting of the variator, this being accomplished by an improved cooperative functioning of indicating and setting mechanism having a minimum of parts and being of compact construction and susceptible of installation without interfering with or complicating the variable drive mechanism.

A general aim of the invention is to provide a simplified variator mechanism of compact structure which will be of light weight and which will exhibit improved momentum and inertia characteristics leading to greater accuracy, which will be of rugged construction so that it will not be likely to require repair or replacement over extended periods of use and which through simplicity of construction and assembly may be manufactured more economically and at lower cost.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
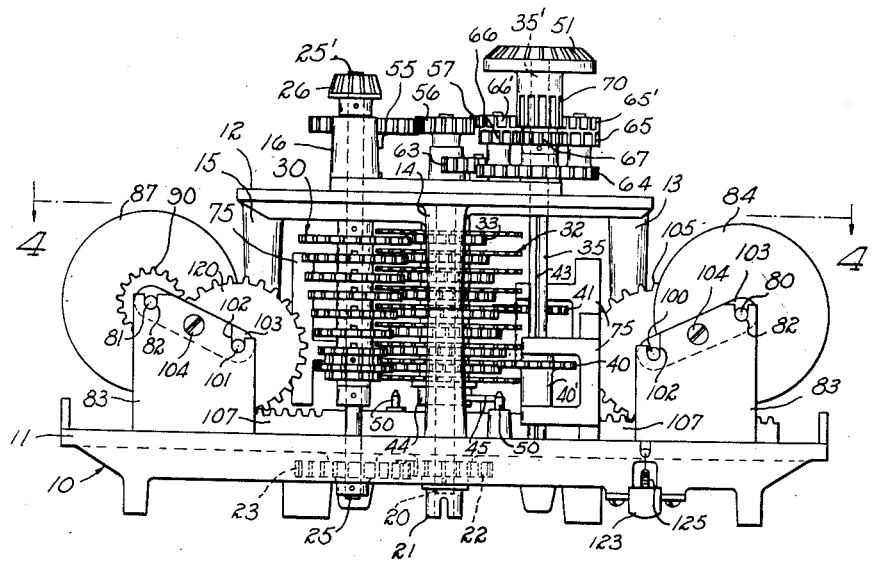
Fig. 1 is a side view of a specific embodiment of the variator of the present invention.
Figure 2:
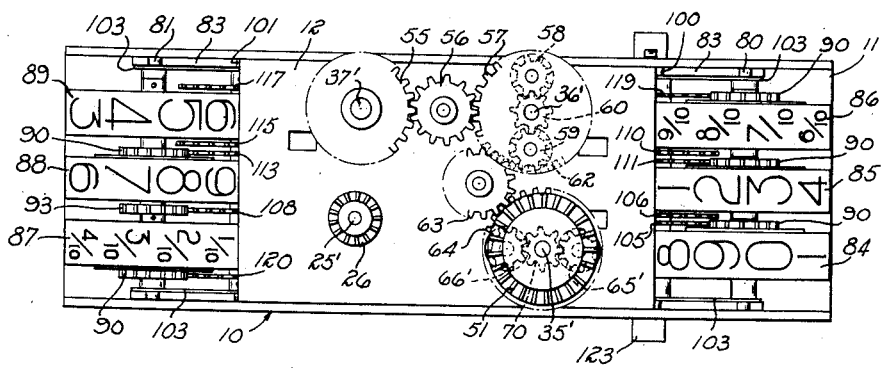
Fig. 2 is a plan view thereof.
Figure 3:
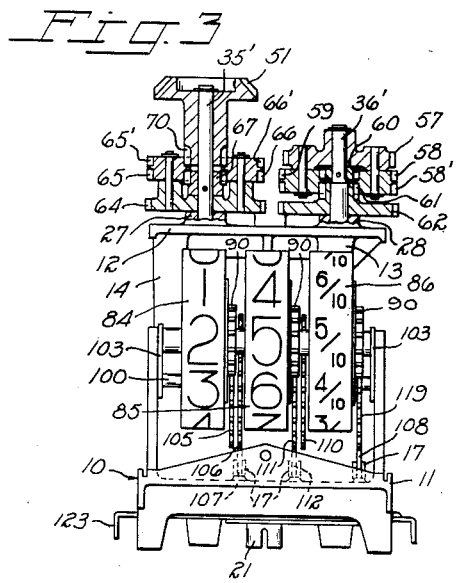
Fig. 3 is an end view of the device with the differential gearing thereof in cross section.

Referring to the drawings, the embodiment of a variator of the present invention shown therein is provided with a frame denoted generally at 10 and comprising a base 11 and a raised platform 12 spaced from the base 11 and supported by posts 13, 14 and 15.

Positioned centrally of the frame is a shaft 20 which is journaled in the base 11 and the platform 12, this shaft being vertically disposed. The bottom of the shaft 20 is provided with a coupling 21 by means of which the shaft may be connected to a driving mechanism such as the conventional meter (not shown) of a liquid dispensing apparatus.

The shaft 20 has fixed thereto above the coupling 21 a gear 22 which is in mesh with a gear 23 fixed to a shaft 25 extending parallel to the shaft 20 and similarly journaled in the base 11 and platform 12. The shaft 25 has an extension 25' extending above and through the journal 16 on the platform 12 and to which is affixed a beveled gear 26. The beveled gear 26 is thus directly driven by the meter and may be utilized for driving the registering mechanism (not shown) for indicating the quantity of liquid dispensed. As will be apparent, the indicating mechanism may be supported, if desired, on the platform 12 with the extension 25' and beveled gear 26 extending upwardly therein. A notched member 44 is mounted on the shaft 20 just above the base 11 where it engages a pawl-like member 45 mounted on the base. The notched member 44 and pawl-like member 45 are designed to permit turning of the shaft 20 in only one direction thus effectively preventing any improper reverse operation of the variator or the associated register (not shown).

Fixed to the shaft 25 is a generally cone-like set of nine gears denoted generally at 30. This cone of gears comprises a series of gears of varying diameter, all rotated by the shaft 25. Mounted on the shaft 20 and freely rotatable with respect thereto are a series of nine varying speed gears 32 which are all of the same diameter and have a like number of teeth. Each of these gears 32 except for the first or bottom gear has attached thereto a smaller gear 33 for rotation in unison therewith. The smaller gears 33 are of varying diameters and are in mesh with the top eight gears of the cone gears 30 fixed to the shaft 25. The first or bottom gear of the cone gears 30 meshes directly with the first or bottom gear of gears 32. The size of the gears 33 and the cone gears 30 is selected so that the series of gears 32 are driven at rates which are in arithmetical progression, that is to say, with the bottom gear 32 being driven at X R. P. M., then the rotation of the second gear 32 is 2X R. P. M., that of the third gear 32 is 3X R. P. M., etc., throughout the series of gears. It will be noted that inasmuch as there are nine gears 32, there will be available a range of speeds varying in sequence in the relationship of 1 through 9.

Range shafts 35, 36 and 37 are mounted for rotation parallel to the shafts 20 and 25, these range shafts being similarly journaled at the top and bottom in the platform 12 and base 11, respectively. For convenience, two of the shafts, namely shafts 36 and 37, are mounted adjacent one side edge of the frame while the remaining range shaft 35 is mounted adjacent the other side edge of the frame.

Figure 5:
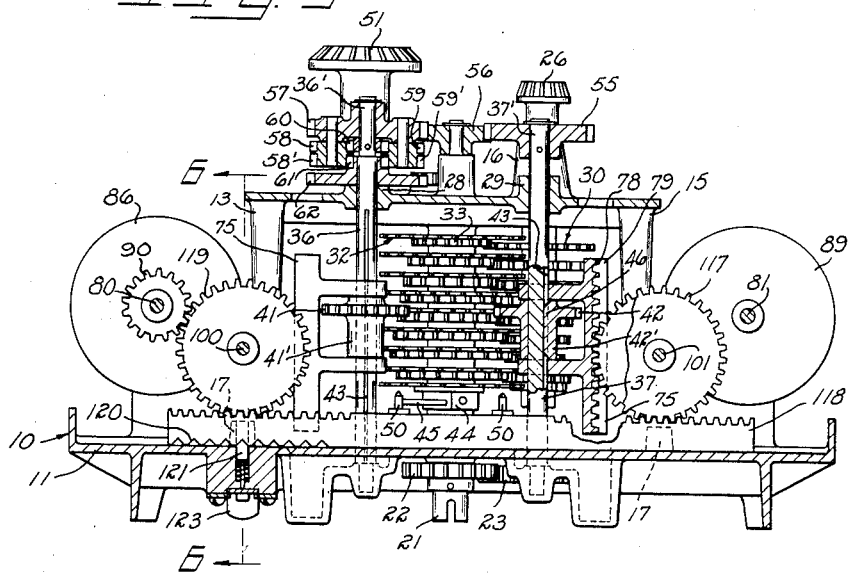
Fig. 5 is a cross-sectional view taken along the line 5—5 of Fig. 4.

Each of the range shafts 35, 36 and 37 carry a range gear denoted at 40, 41 and 42, respectively, these range gears being freely slidable vertically on the range shafts but being non-rotatable with respect thereto by reason of a spline 43, in each shaft, which is engaged, as shown more particularly in Fig. 5 of the drawings, by a key 46 carried by each of the range gears. As will be apparent, the range shafts 35, 36 and 37 are so disposed and the range gears 40, 41 and 42 are of such size that the range gears can be meshed selectively with the series of gears 32 on the shaft 25 merely by adjusting the vertical positions of the range gears 40, 41 and 42. Accordingly, the range shafts 35, 36 and 37 may thus be driven at varying speeds in the relationship of one through nine inclusive, depending upon which of the gears 30 is utilized for driving the range gears mounted on the range shafts.

In order to provide for non-rotation of the range shafts, i. e., a lock-out or zero position, there are provided pins 50 extending upwardly from the base 11 where the range gears 40, 41 and 42 may be brought into engagement therewith.

The range shafts 35, 36 and 37 have extensions 35', 36' and 37' extending through journals 27, 28 and 29, respectively, formed on the platform 12. A take-off bevel gear 51 is rotatably mounted on the extension 35' for driving the price registering mechanism of a register apparatus (not shown) utilized with the variator by the combined outputs of range shafts 35, 36 and 37. The outputs of the range shafts 35, 36 and 37 are combined in proper magnitude for driving the take-off gear 51 by a differential or epicyclic gear train. This gear train comprises a gear 55 fixed to the extension 37' which drives a gear 57 rotatably mounted on the extension 36' through idler gear 56. The gear 57 rotatably supports epicyclic pinions 58 and 59 which are in mesh with a pinion 60 fixed to the extension 36'. Pinions 58' and 59' attached to pinions 58 and 59, respectively, are in mesh with and drive a pinion 61 fixed to the gear 62 which is rotatably mounted on the shaft extension 36'. The gear 62 through idler 63 drives the gear 64 rotatably mounted on the shaft extension 35'. The gear 64 rotatably supports the pinions 65 and 66 which in turn are in mesh with a pinion 67 secured to the shaft extension 35'. Pinions 65' and 66' which are fixed to pinions 65 and 66, respectively, engage the pinion 70 formed on the base of the beveled gear 51. The epicyclic gear train is designed, as will be well understood by one in the art, so that the outputs of range shafts 35, 36 and 37 are combined to drive the take-off gear 51 in the ratio of 1 to 10 to 100, respectively, whereby the output of first range shaft may be made equal to multiples of ten cents, the output of second range shaft may be made equal to units and the output of third range shaft may be made equal to tenths of a cent.

Each of the range gears 40, 41 and 42 is positioned between the legs of a generally U-shaped frame member 75 extending transversely around the periphery of the range gear with its legs extending along opposite faces of the range gear and journaled on the range shaft for sliding movement in a vertical direction. It will be noted that the range gears 40, 41 and 42 are provided with an enlarged hub denoted at 40', 41', and 42' which provide spaced bearing surfaces embraced by the legs of the frame member 75. It thus will be seen that the frame member 75 may be utilized to hold the range gear accurately in any selected vertical position on the range shaft.

Figure 4:
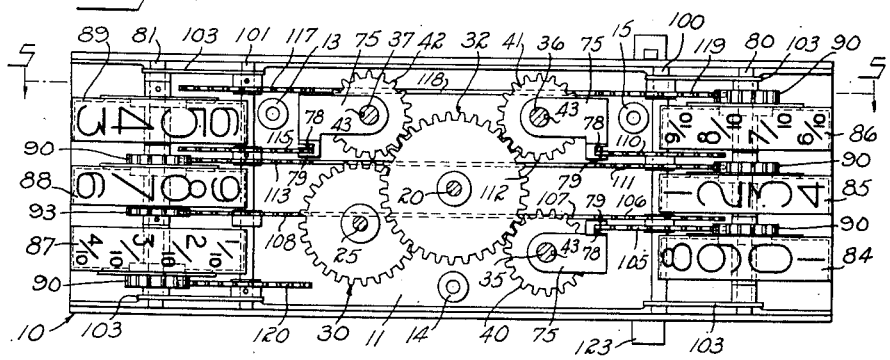
Fig. 4 is a cross-sectional view taken along the line 4—4 of Fig. 1 and looking in the direction of the arrows.

Each of the frame members 75 is provided with a vertical rack 78 having side flanges 79 as best shown in Figs. 4 and 5. By reason of the journaling of the spaced apart legs of the frame members on the range shafts, the vertical positioning of the racks 78 without tilting is assured.

Mounted at opposite ends of the frame and transversely thereof in a horizontal position are shafts 80 and 81 whose ends are rotatably received in notches 82 of the frame members 83. Shaft 80 has mounted thereon a series of three indicating number wheels 84, 85 and 86 while indicating number wheels 87, 88 and 89 are mounted on shaft 81. These number wheels are of higher and lower order and in combination are intended to indicate the cost per gallon of liquid being dispensed as set on the variator, the first of the wheels (86 and 87) indicating tenths, the middle wheels (85 and 88) indicating units, and the third wheels (84 and 89) indicating multiples of ten. All of the number wheels except number wheel 89 are freely rotatable on their respective shafts and have affixed thereto pinions 90 which are provided for rotating same. Number wheel 89 is fixed to the shaft 81 and is adapted to be rotated by a pinion 93 fixed to the shaft 81 between wheels 87 and 88.

Mounted parallel to the shafts 80 and 81 are jack shafts 100 and 101, respectively, which similarly are rotatably journaled in notches 102 in the frame members 83. The plates 103 which may be secured to the frame members 83 by screws 104 are utilized for ease of assembly and to lock the shafts in the notches 82 and 102.

The jack shaft 100 has rotatably mounted thereon a gear 105 which is in mesh with the rack 78 of the positioning frame member 75 associated with the range gear 40 and also with the pinion 99 fixed to the number wheel 84. Accordingly, the vertical position of the range gear 40 is indicated directly by the rotated position of the number wheel 84 and the value of the output of range shaft 35 in terms of the last digit (multiples of ten) of the cost per unit of liquid being dispensed may be indicated by suitable indicia such as the numbers 0 through 9, inclusive.

The position given to number wheel 84 is also given to number wheel 89 mounted diagonally in the opposite end of the frame. This is accomplished through a gear 106 rotatably mounted on the jack shaft 100 and fixed to the gear 105 so as to rotate simultaneously therewith. The gear 106 meshes with an elongated rack 107 which is mounted for horizontal sliding movement in slotted bosses 17 on the base 11. The opposite end of the rack 107 meshes with a gear 108 which is freely mounted on the jack shaft 101 and which in turn meshes with the pinion 93, thus controlling the number wheel 89.

The number wheels 85 and 88 indicate the position of the range gear 41 and thus the output of the range shaft 36, this shaft being the units output shaft. A gear 110 is rotatably mounted on the jack shaft 100 in mesh with rack 78 of the positioning frame 75 associated with range gear 41. This gear 110 has associated therewith an fixed thereto a second gear 111 likewise rotatably mounted on the jack shaft 100. This gear 111 is in mesh with the pinion 90 fixed to wheel 85 and also is in mesh with an elongated rack 112 extending horizontally along the base 11 and mounted for sliding movement in additional slotted bosses 17. The opposite end of the rack 112 engages a gear 113 rotatably mounted on the jack shaft 101 which gear 113 meshes with the pinin 90 fixed to the number wheel 88.

The setting of the range gear 42 and hence the output of range shaft 37 is indicated by number wheels 86 and 87. This is accomplished through a gear 115 fixed to the jack shaft 101 which meshes with the rack 78 of the frame member 75 associated with the range gear 42. The gear 115 being fixed to the jack shaft 101 drives the jack shaft 101 and also the gear 117 which also is fixed to the shaft 101. Gear 117 is in mesh with one end of an elongated rack 118 similar to the racks 107 and 112 and similarly mounted for sliding movement on the base 11 through slotted bosses 17. The opposite end of the rack 118 is in mesh with a gear 119 rotatably mounted on the jack shaft 100 which meshes with the pinion 90 associated with number wheel 86. There is also fixed to the jack shaft 101 a gear 120 which is in mesh with the pinion 90 fixed to the number wheel 87. Accordingly, number wheels 86 and 87 at opposite ends of the frame and diagonally spaced from each other indicate by suitable indicia the setting of the range gear 42, this being measured in tenths of cents.

When it is desired to set the variator, this may be done simply and conveniently in a manual operation, the operator merely grasping the range gear which he desires to set and moving it vertically on its range shaft into mesh with the desired gear 32 or a pin 50 if it is desired to lock out that particular range shaft and the setting of the range gears will be shown automatically on the associated number wheels by the mechanism previously described. As previously mentioned, the range shafts carrying the range gears are mounted closely adjacent the side edge of the variator and these portions are wide open to permit free access to the gears, and whereby it is possible to eliminate any ancillary mechanisms for moving the gears. When setting the range gears, the operator will probably find that the teeth of the gears 32 will not necessarily be in alignment. This is of no particular concern, however, because the operator can readily jiggle the range gear as necessitated to permit it to mesh with or pass through the gears 32. It will be noted that the side flanges 79 of the racks 78 by engagement with the side faces of the gears with which the racks are in mesh effectively prevent any turning of the frame members 75.

To facilitate the accurate positioning of the range gears, each of the racks 107, 112 and 118 is provided with a plurality of notches 120 which are adapted to be engaged by spring pressed plungers 121. The form of the notches and plungers is such that they will permit the range gear and hence the rack to be moved provided suitable force is applied, but they will give a noticeable indication when the range gears are accurately placed.

Figure 6:
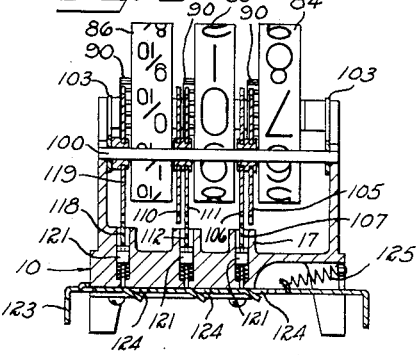
Fig. 6 is a cross-sectional view taken along the line 6—6 of Fig. 5.

In order to form a positive lock for the range gears when placed in selected position, there may be provided a slide 123 extending across the bottom of the plungers 121. The slide 123 is shown with struck out portions 124 for permitting free movement of the plungers 121 when brought into alignment therewith. This can be accomplished readily from either side of the variator by manually pushing or pulling (as the case may be) the slide 121 to the left as indicated in Fig. 6 of the drawings. A spring 125 normally holds the slide in the locking position shown. The shape of the struck out portions 124 is such that they will have a camming effect on the plungers and thus will properly seat them if they are not already fully seated. If the failure of the plungers 121 to properly seat is a result of improper alignment of the range gears with the gears 32, the plungers will cam the racks to proper position, thus correcting or adjusting the setting of the range gears. With the slide 123 in locking position, the plungers 121 cannot be cammed out of the notches 120 and therefore movement of the range gears from selected position is effectively prevented.

It will be noted that the completed variator is in the form of a compact and rugged instrument having no undesirable protuberances and with many of the parts and instrumentalities of conventional variators eliminated but without, however, any sacrifice of function. The instrument is of simplified and convenient construction and assembly leading to economy and low cost in manufacturing, the instrument fully meets the needs of the industry for accuracy and for otherwise accomplishing the functions of preferred commercial variator, and its arrangement for the setting and for indicating the setting, of the range gears has been greatly simplified and improved.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a device of the character described having a series of concentrically mounted gears of equal diameter having a vertical axis of rotation, a drive shaft, means for rotating the gears at different rates of speed from said drive shaft, a range shaft mounted parallel to and in fixed spaced relation to the axis of rotation of said series of gears, a range gear slidably but non-rotatably mounted on the range shaft for meshing selectively with one of the series of gears, and a number wheel for indicating the position of the range gear, the combination comprising a frame for the range gear having open side portions to permit the gear to be grasped by the operator to change the setting of the range gear, a shaft for rotatably supporting the number wheel disposed transversely of the series of gears and intermediate the ends thereof, means forming a driving connection between the frame and the number wheel, and manually releasable locking means for said driving connection.

2. In a device of the character described having a series of concentrically mounted gears of equal diameter, a drive shaft, means for rotating the gears at different rates of speed from said drive shaft, a plurality of range shafts mounted parallel to the axis of rotation of said series of gears, a range gear axially slidable but non-rotatably mounted on each of said range shafts for meshing selectively with one of the series of gears, and two sets of number wheels of higher and lower order for indicating the setting of the range gears, the combination comprising means for mounting the range shafts adjacent a predetermined transverse axis of said series of gears, means for mounting said sets of number wheels on opposite sides of the series of gears and generally parallel to said predetermined transverse axis, a frame for each of said range gears having an open side portion to permit the gear to be grasped by the operator to change the setting of the range gear, means forming a driving connection between each of the frame members and a corresponding number wheel, and means including a rack extending across one end of the series of gears for interconnecting corresponding number wheels of the opposite sets.

3. In a device of the character described having a shaft, a series of gears of equal diameter and of like number of teeth freely rotatable on the said shaft and driven at varying speeds, a range shaft adapted to be mounted parallel to the first named shaft, a range gear axially slidable but non-rotatably mounted on said range shaft for meshing selectively with one of the said series of gears, and indicating means comprising a rotatable indicator member for indicating the setting of the range gear, the combination comprising means for mounting the rotatable indicator member transversely of the said shafts and spaced radially from the said series of gears, positioning means provided with each range shaft and its associated range gear comprising a frame slidably mounted on the range shaft but retained against rotation with the shaft, said frame being disposed radially of the gear to permit the gear to be manually grasped by the operator and having an outwardly facing rack formed thereon, means for positioning the range shaft adjacent one side of the rotatable indicator member to permit the gear positioned thereby to be grasped by the operator during the setting of same, and a driving connection between the rack of the gear positioning frame and the associated indicator member for setting the indicator member when the frame is moved and including a gear meshing with the rack.

4. In a device of the character described having a drive shaft adapted to be rotated by a meter, gear steps mounted to rotate with said drive shaft, a second shaft mounted parallel to the drive shaft, a series of gears of equal diameter and of like number of teeth freely rotatable on the second shaft and driven at varying speeds through said gear steps, a plurality of range shafts adapted to be mounted parallel to the first named shafts, a range gear axially slidable but non-rotatably mounted on each of said range shafts for meshing selectively with one of the said series of gears, and indicating means comprising a plurality of rotatable indicator members of higher and lower order for respectively indicating the setting of the range gears, the combination comprising means for mounting the rotatable indicator members in side by side relationship for rotation about an axis transverse to the said shafts, manually operable positioning means provided with each range shaft and its associated range gear comprising a generally U-shaped frame extending transversely about the periphery of the gear and substantially at right angles to the axis of rotation of said rotatable indicator members with its legs slidably journaled on the shaft to prevent tilting of the frame and for positioning the gear on the shaft therebetween, said frame being provided with an outwardly facing rack thereon, and a driving connection between the rack of each gear positioning frame and its associated indicator member for setting the indicator member when the frame is moved, and including a gear meshing with the rack.

5. In a device of the character described having a drive shaft adapted to be rotated by a meter, gear steps mounted to rotate with said drive shaft, a second shaft mounted parallel to the drive shaft, a series of gears of equal diameter and of like number of teeth freely rotatable on the second shaft and driven at varying speeds through said gear steps, a plurality of range shafts adapted to be mounted parallel to the first named shafts, a range gear axially slidable but non-rotatably mounted on each of said range shafts for meshing selectively with one of the said series of gears, and indicating means comprising a plurality of rotatable indicator members of higher and lower order for respectively indicating the setting of the range gears, the combination comprising a shaft for supporting the rotatable indicator members disposed transversely of the first-mentioned shafts, positioning means provided with each range shaft and its associated range gear comprising a frame slidably mounted on the range shaft but retained against rotation with the shaft for holding said gear in selected vertical position and provided with an outwardly disposed rack, said frame being disposed substantially at right angles to said supporting shaft for the rotatable indicator members, a second shaft parallel to the last-named shaft and a driving connection between the rack of each gear positioning frame and its associated indicator member for setting the indicator member when the frame is moved and including a gear mounted on the second transverse shaft meshing with the rack.

6. In a device of the character described having a drive shaft adapted to be rotated by a meter, gear steps mounted to rotate with said drive shaft, a second shaft mounted parallel to the drive shaft, a series of gears of equal diameter and of like number of teeth freely rotatable on the second shaft and driven at varying speeds through said gear steps, a plurality of range shafts adapted to be mounted parallel to the first named shafts, a range gear axially slidable but non-rotatably mounted on each of said range shafts for meshing selectively with one of the said series of gears, and indicating means comprising a plurality of rotatable number wheels of higher and lower order for respectively indicating the setting of the range gears, the combination comprising a pair of shafts spaced at opposite sides of the said second shaft and extending transversely thereto for supporting a plurality of rotatable number wheels of higher and lower order in side by side relationship on each of said transverse shafts, positioning means provided with each range shaft and its associated range gear comprising a frame slidably mounted on the range shaft but retained against rotation with the shaft for holding said gear in selected vertical position and provided with an outwardly facing rack, a driving connection between the rack of each gear positioning frame and an associated number wheel for setting the number wheel when the frame is moved, and including a gear meshing with the rack, and connecting means for synchronizing the position of each pair of corresponding number wheels on said opposite shafts, including an elongated rack mounted for movement transversely of said second shaft and gear means meshing with the elongated rack.

7. In a device of the character described having a drive shaft adapted to be rotated by a meter, gear steps mounted to rotate with said drive shaft, a second shaft mounted parallel to the drive shaft, a series of gears of equal diameter and of like number of teeth freely rotatable on the second shaft and driven at varying speeds through said gear steps, a plurality of range shafts adapted to be mounted parallel to the first named shafts, a range gear axially slidable but non-rotatably mounted on each of said range shafts for meshing selectively with one of the said series of gears, and indicating means comprising a plurality of rotatable number wheels of higher and lower order for respectively indicating the setting of the range gears, the combination comprising a pair of shafts spaced at opposite sides of the said second shaft and extending transversely thereto for supporting the rotatable number wheels of higher and lower order in side by side relationship on each of said transverse shafts, positioning means provided with each range shaft and its associated range gear comprising a frame slidably mounted on the range shaft but retained against rotation with the shaft for holding said gear in selected vertical position and provided with an outwardly facing rack, a driving connection between the rack of each gear positioning frame and an associated number wheel for setting the number wheel when the frame is moved, and including a gear meshing with the rack, and connecting means for synchronizing the position of each pair of corresponding number wheels on said opposite shafts, including an elongated rack mounted for movement transversely of said second shaft and gear means meshing with the elongated rack, and means for retaining the range gears, positioning frames, and number wheels in selected position comprising releasable means engaging the elongated racks.

8. In a device of the character described having a drive shaft adapted to be rotated by a meter, gear steps mounted to rotate with said drive shaft, a second shaft mounted parallel to the drive shaft, a series of gears of equal diameter and of like number of teeth freely rotatable on the second shaft and driven at varying speeds through said gear steps, a plurality of range shafts adapted to be mounted parallel to the first named shafts, a range gear axially slidable but non-rotatably mounted on each of said range shafts for meshing selectively with one of the said series of gears, and indicating means comprising a plurality of rotatable indicator members of higher and lower order for respectively indicating the setting of the range gears, the combination comprising a pair of shafts spaced at opposite sides of the said second shaft and extending transversely thereto for supporting the rotatable number wheels of higher and lower order in side by side relationship on each of said transverse shafts, positioning means provided with each range shaft and its associated range gear comprising a frame slidably mounted on the range shaft but retained against rotation with the shaft for holding said gear in selected vertical position and provided with an outwardly facing rack, a driving connection between the rack of each gear positioning frame and an associated number wheel for setting the number wheel when the frame is moved, and including a gear meshing with the rack, and connecting means for synchronizing the position of each pair of corresponding number wheels on said opposite shafts, including an elongated rack mounted for movement transversely of said second shaft and gear means meshing with the elongated rack, each of said elongated racks being provided with a series of notches, and means for retaining the range gears, positioning frames, and number wheels in selected position comprising a plunger biased into engagement with the notches of each elongated rack.

9. In a device of the character described having a drive shaft adapted to be rotated by a meter, gear steps mounted to rotate with said drive shaft, a second shaft mounted parallel to the drive shaft, a series of gears of equal diameter and of like number of teeth freely rotatable on the second shaft and driven at varying speeds through said gear steps, a plurality of range shafts adapted to be mounted parallel to the first named shafts, a range gear axially slidable but non-rotatably mounted on each of said range shafts for meshing selectively with one of the said series of gears, and indicating means comprising a plurality of rotatable number wheels of higher and lower order for respectively indicating the setting of the range gears, the combination comprising a pair of shafts spaced at opposite sides of the said second shaft and extending transversely thereto for supporting rotatable number wheels of higher and lower order in side by side relationship on each of said transverse shafts, positioning means provided with each range shaft and its associated range gear comprising a frame slidably mounted on the range shaft but retained against rotation with the shaft for holding said gear in selected vertical position and provided with an outwardly facing rack, a driving connection between the rack of each gear positioning frame and an associated number wheel for setting the number wheel when the frame is moved, and including a gear meshing with the rack, and connecting means for synchronizing the position of each pair of corresponding number wheels on said opposite shafts, including an elongated rack mounted for movement transversely of said second shaft and gear means meshing with the elongated rack, each of said elongated racks being provided with a series of notches, means for retaining the range gears, positioning frames, and number wheels in selected position comprising a plunger biased into engagement with the notches of each elongated rack and releasable locking means for retaining the plungers in engagement with said notches.

10. In a device of the character described having a drive shaft adapted to be rotated by a meter, gear steps mounted to rotate with said drive shaft, a second shaft mounted parallel to the drive shaft, a series of gears of equal diameter and of like number of teeth freely rotatable on the second shaft and driven at varying speeds through said gear steps, a plurality of range shafts adapted to be mounted parallel to the first named shafts, a range gear axially slidable but non-rotatably mounted on each of said range shafts for meshing selectively with one of the said series of gears, and indicating means comprising a plurality of rotatable number wheels of higher and lower order for respectively indicating the setting of the range gears, the combination comprising a pair of horizontal shafts spaced at opposite sides of the said second shaft for mounting a plurality of number wheels of lower and higher order on each of the horizontal shafts, pinions mounted on the said horizontal shafts and respectively connected to the number wheels mounted thereon, positioning means provided with each range shaft and its associated range gear comprising a frame slidably mounted on the range shaft and retained against rotation therewith for holding said gear in selected vertical position and provided with an outwardly facing rack, and means for setting the number wheels when the frames are moved, including a jack shaft parallel to each of said number wheel supporting shafts disposed between each of said supporting shafts and the said second shaft, a plurality of horizontal sliding elongated rack members extending between said jack shafts, and gear means on the jack shafts meshing with the racks of said gear positioning frames with said sliding racks and with the pinions connected to the number wheels.

11. In a device of the character described having a drive shaft adapted to be rotated by a meter, gear steps mounted to rotate with said drive shaft, a second shaft mounted parallel to the drive shaft, a series of gears of equal diameter and of like number of teeth freely rotatable on the second shaft and driven at varying speeds through said gear steps, a plurality of range shafts adapted to be mounted parallel to the first named shafts, a range gear axially slidable but non-rotatably mounted on each of said range shafts for meshing selectively with one of the said series of gears, and indicating means comprising a plurality of rotatable number wheels of higher and lower order for respectively indicating the setting of the range gears, the combination comprising a pair of shafts spaced at opposite sides of the said second shaft and extending transversely thereto for supporting the number wheels of lower and higher order to provide corresponding number wheels at radially opposite sides of the said series of gears for respectively indicating the setting of the range gears, positioning means provided with each range shaft and its associated range gear comprising a generally U-shaped member extending transversely about the periphery of the range gear with its legs slidably journaled on the range shaft to prevent tilting of the member and extending generally radially of the said number wheel shafts and for positioning the range gear on the range shaft, said U-shaped member being provided with an outwardly facing rack, a connection between the rack of each gear positioning member and an associated number wheel for setting the wheel when the U-shaped member is moved and including a gear meshing with the rack, and means for synchronizing the movement of oppositely positioned corresponding number wheels, including longitudinally movable elongated racks and gear means meshing therewith.

HARVEY N. BLISS.

REFERENCES CITED

The following references are of record in the file of this patent:

UNITED STATES PATENTS

| Number | Name | Date |
|---|---|---|
| 2,159,109 | Spaunberg et al. | May 23, 1939 |
| 2,220,159 | Kolb | Nov. 5, 1940 |
| 2,311,031 | DeLancey | Feb. 16, 1943 |
| 2,375,787 | Hazard | May 15, 1945 |
| 2,476,275 | Bliss | July 19, 1949 |